No. 716,076. Patented Dec. 16, 1902.
L. MELANOWSKI.
BRAKE.
(Application filed June 6, 1902.)
(No Model.)
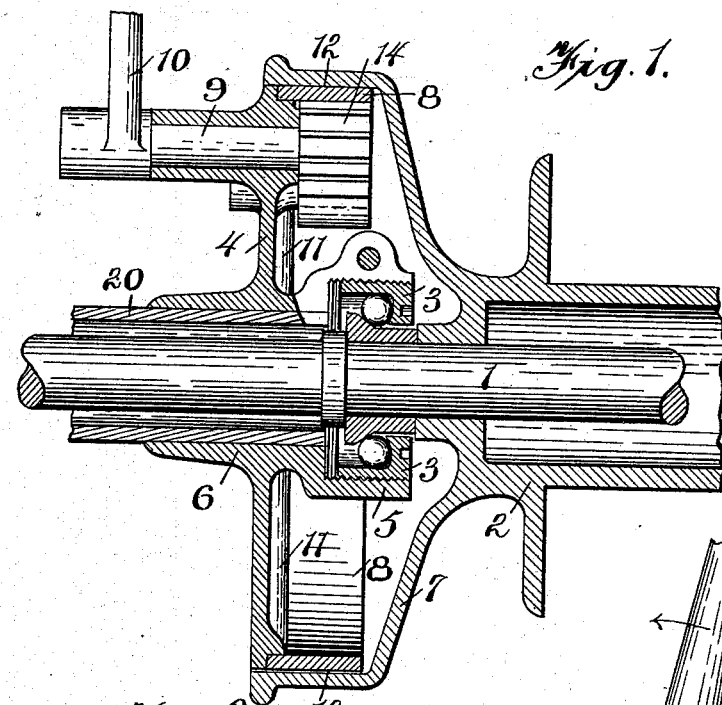
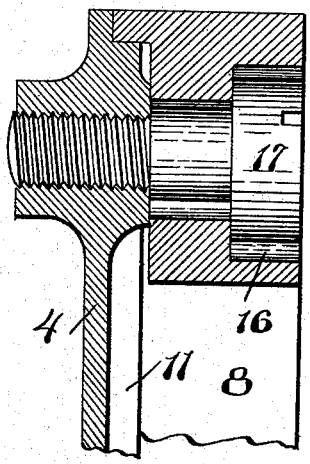
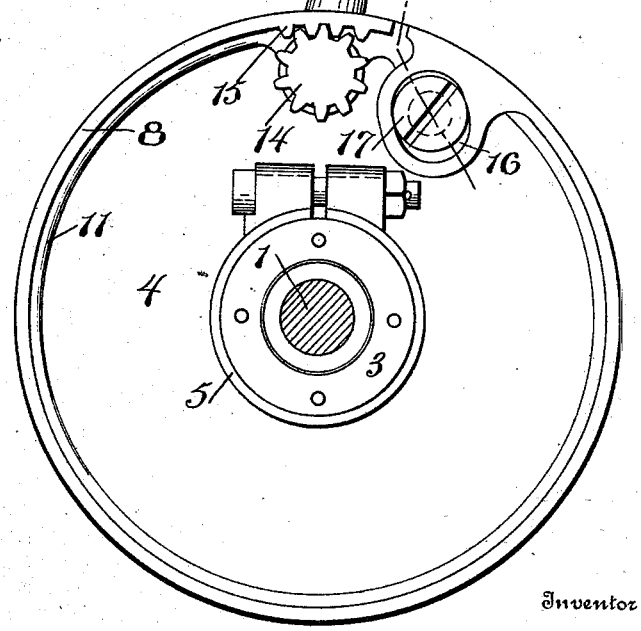
Witnesses
Geo. E. Frech.
Chas. P. Wright Jr.
Inventor
Leo Melanowski;
By
A. S. Pattison,
Attorney
THE NORRIS PETERS CO., PHOTO-LITHO., WASHINGTON, D. C.

UNITED STATES PATENT OFFICE.

LEO MELANOWSKI, OF CLEVELAND, OHIO, ASSIGNOR TO THE WINTON MOTOR CARRIAGE COMPANY, A CORPORATION OF OHIO.

BRAKE.

SPECIFICATION forming part of Letters Patent No. 716,076, dated December 16, 1902.

Application filed June 6, 1902. Serial No. 110,525. (No model.)

*To all whom it may concern:*

Be it known that I, LEO MELANOWSKI, a citizen of the Republic of France, residing at Cleveland, in the county of Cuyahoga and State of Ohio, have invented new and useful Improvements in Brakes, of which the following is a specification.

My invention relates to improvements in brakes, and while adapted to be used in other connections it is especially intended for use in connection with automobiles.

My brake involves a construction whereby the braking member is entirely inclosed, which prevents the action of dust in wearing the same and which is simple in construction and effective in its action.

In the accompanying drawings, Figure 1 is a sectional view of a brake embodying my invention. Fig. 2 is an internal side elevation with the inclosing member removed. Fig. 3 is a sectional view on the line 3 3 of Fig. 2.

In the accompanying drawings my invention is shown as being applied to an automobile, and in which—

1 represents the axle, and 2 the hub of the wheel.

3 is a bearing for the axle, the wheel-hub 2 in this instance being keyed or otherwise securely fastened to the driving-shaft 1.

4 is a disk which is suitably rigidly supported by the tube 20 and which has an internally-projecting flange 5, which forms a part of the aforementioned bearing 3. The said disk 4 is also provided with a projecting hub or flange 6, surrounding the tube 20, and the hub 2 is provided with an expanded housing 7, which produces a space adapted to receive the braking member (to be hereinafter described) and the disk 4. As clearly shown in Fig. 1, the disk 4 forms a closure or end for the housing 7, whereby the braking band or member 8 is entirely inclosed within the housing 7 of the wheel-hub 2. A suitable oscillating or rock shaft 9 is journaled in the disk or wall 4 and carries a rigid operating member or lever 10, which will be connected in any desired manner with a member located where the operator can conveniently work it for applying or releasing the brake member 8.

The brake member 8 consists of a band which is normally contracted and made of sufficient spring to normally assume the position shown in Fig. 1 and to snugly grip the inwardly-extending annular flange 11. This annular flange 11 forms a useful purpose in causing the band to assume a proper contour to prevent it when not expanded from rubbing against the inner brake-surface 12 of the housing 7.

The inner end of the rock-shaft 9 is provided with a pinion or toothed member 14, and the inner side of one end of the brake member or band 8 is provided with a toothed portion 15, engaged by the said pinion 14. The opposite end of the band 8 is provided with an inclined slot 16, through which a suitable stud or screw 17 passes. This screw or stud is firmly attached to the disk 4, as clearly shown in Fig. 3.

In operation when the lever 10 is moved in the direction indicated by arrow in Fig. 2 the band is caused to expand, and, owing to the inclined slot 16, the two ends of the band, and throughout its entire circumference expands uniformly and engages uniformly the entire inner brake-surface 12 of the hub-housing 7. When the lever 10 is moved in the opposite direction, the band will contract, owing to its spring construction, and be released from and out of engagement with the inner brake-surface 12 of the said housing 7.

Since the wheel 2 is secured rigidly to the shaft 1, it will be noted that the housing 7 is, in consequence thereof, also rigidly secured to the shaft 1, and while I prefer and while it is one feature of my present construction to form the housing 7 upon the hub of the wheel, yet it will be readily understood that it may be separate from the hub of the wheel and rigidly connected to the axle in any desired manner without departing from the spirit and scope of my present invention.

Having thus described my invention, what I claim, and desire to secure by Letters Patent, is—

1. A brake of the character described, including a stationary member, a brake-band, a movable operating member connected directly with one end of said band, the opposite end of the band laterally movably connected with said stationary member, and a coacting surrounding brake member.

2. A brake of the character described including a stationary member, a brake-band, a movable operating member connected directly with one end of the band, the opposite end of the band, provided with an inclined surface, a stationary member engaging said inclined surface, and a coacting surrounding brake member.

3. A brake of the character described including a stationary member carrying a brake-band, the inner side of one end of the brake-band having a toothed portion, an oscillating toothed member in engagement therewith, the opposite end of the brake-band provided with an inclined surface, a stationary member engaging the inclined surface, and a movable coacting brake member surrounding the said brake-band, substantially as described.

4. A brake-band member carrying a brake-band, the inner side of one end of the brake-band having a plurality of teeth, an oscillating toothed member in engagement therewith, the opposite end of the brake-band provided with an inclined slot, a projection passing through the inclined slot and supported by the said stationary member, and a movable coacting brake member surrounding the said brake-band, substantially as described.

In testimony whereof I have hereunto set my hand in the presence of two subscribing witnesses.

LEO MELANOWSKI.

Witnesses:
 THOS. HENDERSON,
 GEO. H. BROWN.